(12) United States Patent
Kim et al.

(10) Patent No.: US 11,893,973 B2
(45) Date of Patent: Feb. 6, 2024

(54) DEVICE AND METHOD FOR GENERATING SOUND FOR VEHICLE

(71) Applicants: Hyundai Motor Company, Seoul (KR); Kia Corporation, Seoul (KR)

(72) Inventors: Ki Chang Kim, Gyeonggi-do (KR); Tae Kun Yun, Gyeonggi-do (KR); Dong Chul Park, Gyeonggi-do (KR); Eun Soo Jo, Gyeonggi-do (KR); Jin Sung Lee, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/889,274

(22) Filed: Aug. 16, 2022

(65) Prior Publication Data
US 2023/0186894 A1  Jun. 15, 2023

(30) Foreign Application Priority Data

Dec. 14, 2021 (KR) .................. 10-2021-0178966

(51) Int. Cl.
*G10K 15/02* (2006.01)
*B60Q 5/00* (2006.01)

(52) U.S. Cl.
CPC ............ *G10K 15/02* (2013.01); *B60Q 5/008* (2013.01)

(58) Field of Classification Search
CPC ................................ G10K 15/02; B60Q 5/008
See application file for complete search history.

(56) References Cited

U.S. PATENT DOCUMENTS

| 2005/0113168 A1* | 5/2005 | Maeda ............... G10K 15/02 463/35 |
| 2007/0140503 A1* | 6/2007 | Sakamoto ........ G10K 11/17883 381/71.4 |
| 2008/0192954 A1* | 8/2008 | Honji .................. G10K 15/04 381/86 |
| 2012/0257763 A1* | 10/2012 | Bowden ........... G10K 11/17823 381/71.4 |

(Continued)

FOREIGN PATENT DOCUMENTS

| KR | 10-1744716 B1 | 6/2017 |
| KR | 10-1856935 B1 | 5/2018 |

(Continued)

OTHER PUBLICATIONS

Donahue et al., "Adversarial Audio Synthesis", Feb. 9, 2019, conference paper at ICLR 2019, arXiv:1802.04208v3, pp. 1-16. (Year: 2019).*

(Continued)

*Primary Examiner* — Daniel R Sellers
(74) *Attorney, Agent, or Firm* — Fox Rothschild LLP

(57) ABSTRACT

Disclosed is a sound design method for overcoming sense of difference when there is no virtual sound while an auto cruise control is activated. The method includes determining whether an accelerator pedal is actuated; upon determining that the accelerator pedal is not actuated, determining whether an auto cruise control system is operating; upon determining whether the auto cruise control system is operating, classifying a vehicle speed-based order component from a driving sound; and reproducing a speed sensitive virtual sound based on the classified vehicle speed-based order component.

11 Claims, 8 Drawing Sheets

(56) References Cited

U.S. PATENT DOCUMENTS

| | | | |
|---|---|---|---|
| 2015/0117670 A1* | 4/2015 | Lee | G10K 15/02 |
| | | | 381/86 |
| 2020/0324697 A1* | 10/2020 | Lee | B60W 40/08 |
| 2021/0295817 A1* | 9/2021 | Gomez | B60Q 5/008 |
| 2021/0407492 A1* | 12/2021 | Chang | G10L 25/18 |
| 2022/0355732 A1 | 11/2022 | Kim et al. | |

FOREIGN PATENT DOCUMENTS

| | | |
|---|---|---|
| KR | 10-2131390 B1 | 7/2020 |
| KR | 10-2022-0150692 A | 11/2022 |

OTHER PUBLICATIONS

Chang et al., "Technology of an Emotional Engine Sound Designing for Active Sound Control Using Order Balance and Musical Instrument Sound", Jun. 15, 2016, SAE Technical Paper, https://www.researchgate.net/publication/304009598, pp. 1-23. (Year: 2016).*

Yun Taekun et al. "Musical Harmonic Theory Analysis of Automotive Interior Noise" Oct. 2012 pp. 358-363.

\* cited by examiner

[1-LEVEL]

[2-LEVEL]

[3-LEVEL]

DEVICE AND METHOD FOR GENERATING SOUND FOR VEHICLE

CROSS-REFERENCE TO RELATED APPLICATION

This application is based on and claims the benefit of Korean Patent Application No. 10-2021-0178966, filed in the Korean Intellectual Property Office on Dec. 14, 2021, the entire contents of which are incorporated herein by reference.

TECHNICAL FIELD

Embodiments of the present disclosure relate to a device and method for generating a sound for a vehicle.

DESCRIPTION OF RELATED ART

Electric vehicles such as electric vehicles and hydrogen electric vehicles are driven by electric motors. Thus, there is no engine sound, thereby making it difficult for pedestrians to recognize approach of the vehicle thereto. In order to solve this problem, a virtual engine sound system (VESS) and an acoustic vehicle alert system (AVAS) that generates a virtual engine sound and allows pedestrians to recognize the approach have been developed, and compulsorily installed in the electrified vehicles.

In the virtual engine sound system, the engine sound is realized using an Electronic Sound Generator (ESG). The ESG is mounted on a vehicle's cowl top panel. When an engine sound is generated, the ESG uses vehicle body vibration to generate an added sound (structural vibration sound). However, a joint is formed at a welding part of a cowl bracket of the vehicle body on which the ESG is mounted and a cowl top cover, and a quality cost for structural reinforcement and vibration insulation is excessive.

SUMMARY

Embodiments of the present disclosure have been made to solve the above-mentioned problems occurring in the existing technology while advantages achieved by the existing technology are maintained intact.

An exemplary embodiment of the present disclosure provides a device and method for generating a sound for a vehicle that generates a virtual sound based on a vehicle speed when an auto cruise control system operates.

The technical problems to be solved by embodiments of the present disclosure are not limited to the aforementioned problems, and any other technical problems not mentioned herein will be clearly understood from the following description by those skilled in the art to which embodiments of the present disclosure pertain.

According to an exemplary embodiment of the present disclosure, a method for generating a sound for a vehicle includes determining whether an accelerator pedal is actuated; upon determining that the accelerator pedal is not actuated, determining whether an auto cruise control system is operating; upon determining whether the auto cruise control system is operating; classifying a vehicle speed-based order component from a driving sound; and reproducing a speed sensitive virtual sound based on the classified vehicle speed-based order component.

The classifying of the vehicle speed-based order component may include analyzing a colormap of the driving sound using a deep learning-based colormap sound quality analysis algorithm and classifying the analysis result into order components of three levels.

The reproducing of the speed sensitive virtual sound may include synthesizing the classified vehicle speed-based order component with an emotion sound generated by the big data-based driving emotion model to generate a synthesized sound and adjusting a tone color and a resistance of the synthesized sound based on the vehicle speed to generate the speed sensitive virtual sound.

The reproducing of the speed sensitive virtual sound further may include repeatedly performing mixing between a driving sound before the operation of the auto cruise control system and the speed sensitive virtual sound after the operation of the auto cruise control system.

The determining of whether the accelerator pedal is actuated may include determining whether the accelerator pedal is being actuated based on an accelerator pedal open value measured by an accelerator pedal position sensor.

The reproducing of the speed sensitive virtual sound may include generating sound pressure change data based on the accelerator pedal open value and synthesizing the classified vehicle speed-based order component with the generated sound pressure change data to generate the speed sensitive virtual sound.

According to an exemplary embodiment of the present disclosure, a device for generating a sound for a vehicle includes a detector for detecting whether an accelerator pedal is actuated and whether an auto cruise control system is operating, and a processor configured to, upon detection that the auto cruise control system is operating while the accelerator pedal is not actuated, classify a vehicle speed-based order component from a driving sound, and reproduce a speed sensitive virtual sound based on the classified vehicle speed-based order component.

The processor may be configured to analyze a colormap of the driving sound using a deep learning-based colormap sound quality analysis algorithm and classify the analysis result into order components of three levels.

The processor may be configured to synthesize the classified vehicle speed-based order component with an emotion sound generated by a big data-based driving emotion model to generate a synthesized sound and adjust a tone color and a resistance of the synthesized sound based on the vehicle speed to generate the speed sensitive virtual sound.

The processor may be configured to repeatedly perform mixing between a driving sound before the operation of the auto cruise control system and the speed sensitive virtual sound after the operation of the auto cruise control system.

The detector measures the accelerator pedal open value using an accelerator pedal position sensor, wherein the processor may be configured to determine whether the accelerator pedal is being actuated based on the accelerator pedal open value.

The processor may be configured to generate sound pressure change data based on the accelerator pedal open value and synthesize the classified vehicle speed-based order component with the generated sound pressure change data to generate the speed sensitive virtual sound.

As discussed, the method and apparatus suitably include use of a controller or processer.

In another embodiment, vehicles are provided that comprise an apparatus as disclosed herein.

BRIEF DESCRIPTION OF THE DRAWINGS

The above and other objects, features and advantages of embodiments of the present disclosure will be more apparent from the following detailed description taken in conjunction with the accompanying drawings.

DETAILED DESCRIPTION

Figure 1:
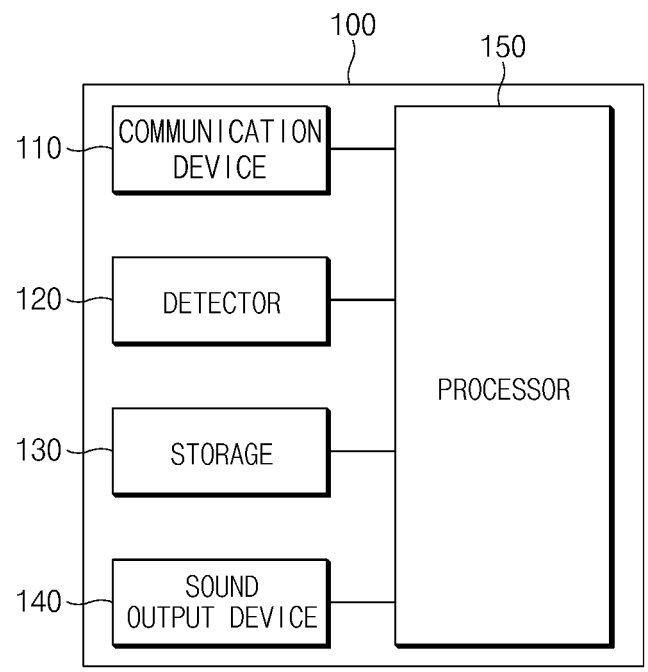
FIG. 1 is a block diagram showing a device for generating a sound for a vehicle according to embodiments of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, and the like, and includes hybrid vehicles, electric vehicles, plug-in hybrid electric vehicles. As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation and can be implemented by hardware components or software components and combinations thereof.

Further, the control logic of embodiments of the present disclosure may be embodied as non-transitory computer readable media on a computer readable medium containing executable program instructions executed by a processor, controller, or the like. Examples of computer readable media include, but are not limited to, ROM, RAM, compact disc (CD)-ROMs, magnetic tapes, floppy disks, flash drives, smart cards, and optical data storage devices. The computer readable medium can also be distributed in network coupled computer systems so that the computer readable media is stored and executed in a distributed fashion, e.g., by a telematics server or a Controller Area Network (CAN).

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of the related known configuration or function will be omitted upon determining that it interferes with the understanding of the embodiment of the present disclosure.

In describing the components of the embodiment according to the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 2:
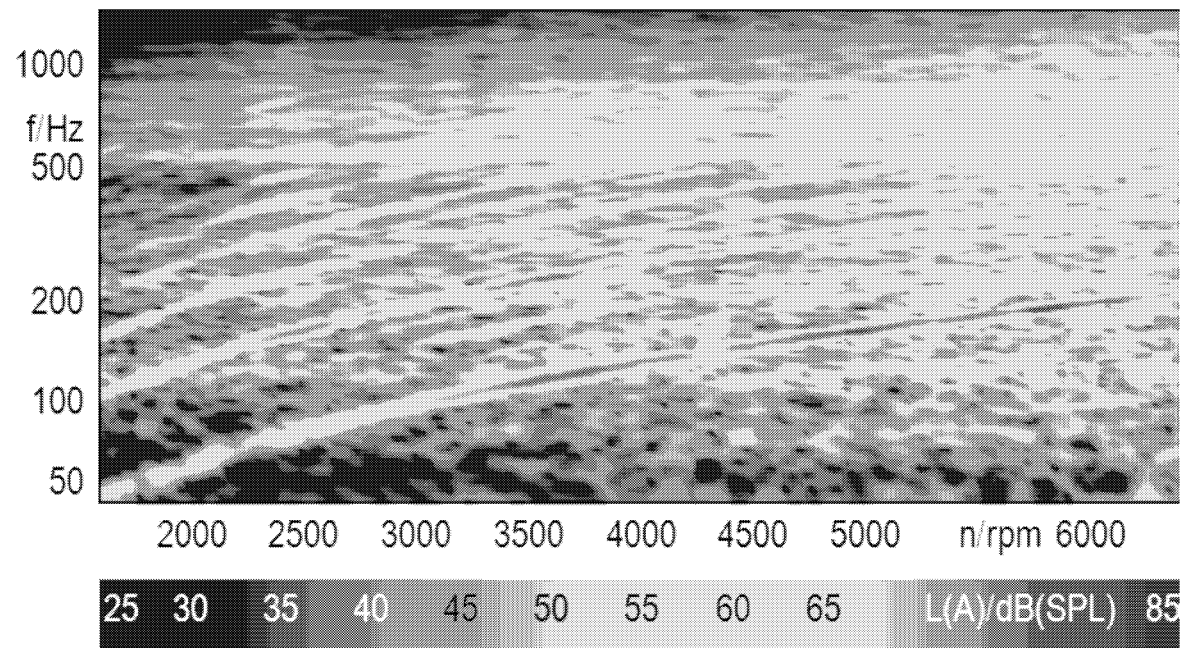
FIG. 2 is an exemplary diagram illustrating a colormap representing a change in a sound volume and a tone color of a driving sound based on a driver's driving pattern according to embodiments of the present disclosure.
Figure 3:
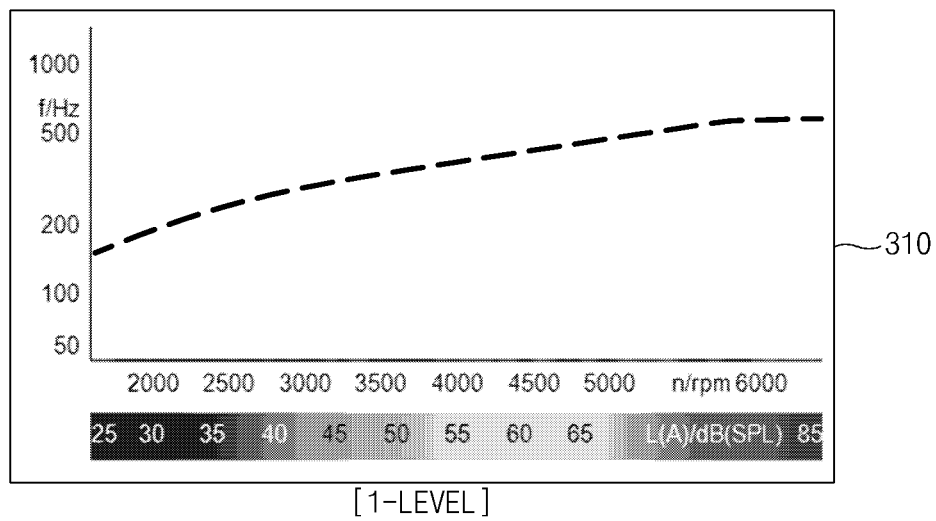
FIG. 3 is an exemplary diagram illustrating three-level classifications of order components according to embodiments of the present disclosure.
Figure 3:
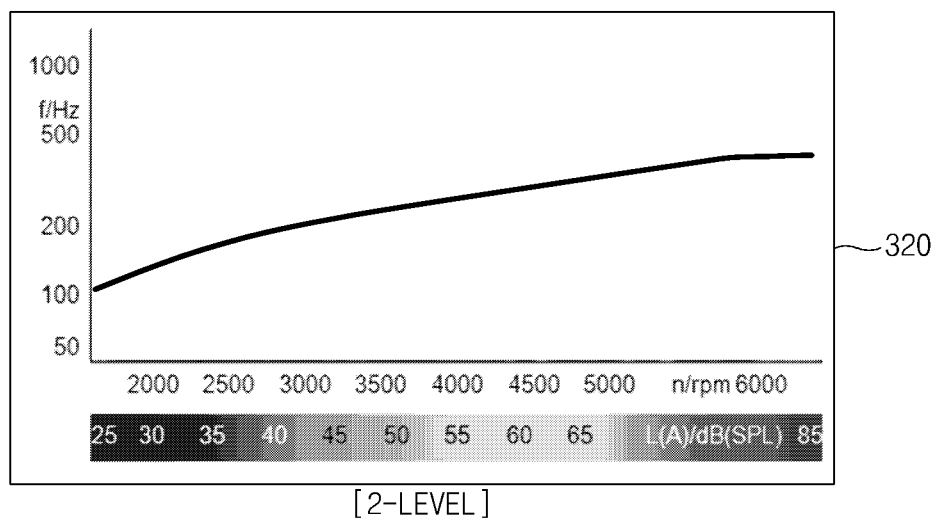
Figure 3:
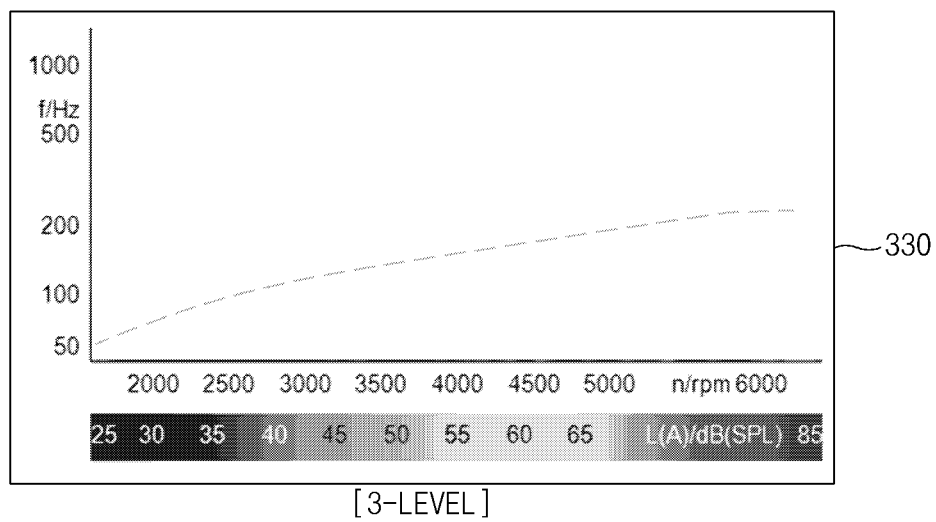

FIG. 1 is a block diagram showing a device for generating a sound for a vehicle according to embodiments of the present disclosure. FIG. 2 is an exemplary diagram illustrating a colormap representing a change in a sound volume and a tone color of a driving sound based on a driver's driving pattern according to embodiments of the present disclosure. FIG. 3 is an exemplary diagram illustrating three-level classifications of order components according to embodiments of the present disclosure.

A device for generating a sound for a vehicle (hereinafter, a sound generating device 100) may be mounted on an electrified vehicle that operates using an electric motor such as electric vehicle (EV), plug-in hybrid electric vehicle (PHEV), and/or hybrid electric vehicle (HEY), etc. The sound generating device 100 may include a communication device 110, a detector 120, storage 130, a sound output device 140 and a processor 150, as shown in FIG. 1.

The communication device 110 may support the sound generating device 100 to communicate with electronic control units (ECUs) mounted on the vehicle. The communication device 110 may include a transceiver for transmitting and receiving a controller area network (CAN) message using a CAN protocol. The communication device 110 may support the sound generating device 100 to communicate with an external electronic device such as a terminal and a server. The communication device 110 may include a wireless communication circuit such as a cellular communication circuit, a short-range communication circuit, and/or a global navigation satellite system (GNSS) communication circuit and/or a wired communication circuit such as a local area network (LAN) communication circuit, and/or a power line communication circuit, etc.

The detector 120 may detect vehicle information, for example, driving information and/or vehicle indoor/outdoor environment information. The detector 120 may use at least one sensor and/or at least one ECU mounted on the vehicle to detect vehicle information such as a vehicle speed, a motor revolution per minute (RPM), an accelerator pedal open value, a throttle open value, a vehicle internal temperature and/or an external temperature. The sensor may include an accelerator position sensor (APS), a throttle position sensor, a global positioning system (GPS) sensor, a wheel speed sensor, a temperature sensor, a microphone, an image sensor, an advanced driver assistance system (ADAS) sensor, a 3-axis accelerometer, and/or an inertial measurement unit (IMU), etc. The ECU may include a motor control unit (MCU) and/or a vehicle control unit (VCU), and the like.

The storage 130 may store sound sources such as driving sounds, virtual sounds and/or warning sounds. The storage 130 may store an emotion recognition model, a virtual sound design algorithm, a sound volume setting algorithm, a sound volume control logic and/or a sound equalizer logic, and the like. The emotion recognition model may be implemented based on a sound based emotion factor and a dynamic characteristic-based emotion factor. The virtual sound design algorithm may be obtained by adding an engine sound equalizer (ESE) logic for personalization to an existing active sound design (ASD) function, based on a target profile and engine information such as RPM, throttle and/or torque, etc. and may design a performance sound of the vehicle.

The storage 130 may be a non-transitory storage medium that stores instructions executed by the processor 150. The storage 130 may include at least one of storage media such as a random access memory (RAM), a static random access memory (SRAM), a read only memory (ROM), a programmable ROM (PROM), an electrically erasable and programmable ROM (EEPROM), an erasable and programmable ROM (EPROM), a hard disk drive (HDD), a solid state disk (SSD), an embedded multimedia card (eMMC), a universal flash storage (UFS), and/or web storage.

The sound output device 140 may reproduce a sound source that is pre-stored or streamed in real time and output the same to an outside. The sound output device 140 may include an amplifier and/or a speaker. The amplifier may amplify an electrical signal of a music sound reproduced by the sound output device 140. A plurality of speakers may be installed at different locations inside and/or outside the vehicle and may convert the electric signal amplified by the amplifier into sound waves.

The processor 150 may be configured to be electrically connected to each of the components 110 to 140. The processor 150 may be configured to include at least one of processing devices such as an application specific integrated circuit (ASIC), a digital signal processor (DSP), a programmable logic device (PLD), a field programmable gate array (FPGA), a central processing unit (CPU), a microcontroller and/or a microprocessor.

The processor 150 may be configured to determine whether an accelerator pedal is actuated while the vehicle is driving. The processor 150 may be configured to determine whether the driver actuates the accelerator pedal based on an accelerator pedal open value.

The processor 150 may be configured to generate a virtual sound based on engine sound equalizer personalization setting information when the driver is manipulating the accelerator pedal. The engine sound equalizer personalization setting information may be set by the user's user interface (UI) manipulation, and may include a sound mode, a sound volume, a tone color and/or an accelerator pedal response. The processor 150 may be configured to acquire an internal input signal parameter (i.e., CAN information) and/or an external input signal parameter (e.g., GPS information) using the detector 120. In other words, the processor 150 may be configured to acquire the vehicle information using the detector 120. The processor 150 may be configured to generate a virtual sound based on the obtained vehicle information. The processor 150 may be configured to adjust the sound volume, the tone color, and/or a sound output timing of the virtual sound when generating the virtual sound. The processor 150 may be configured to transmit the generated virtual sound to the sound output device 140. The sound output device 140 may reproduce and output the generated virtual sound according to a command of the processor 150.

The processor 150 may be configured to check whether the auto cruise control system is operating when the accelerator pedal is not actuated. In other words, the processor 150 may be configured to check whether the auto cruise control system is operating when the driver does not manipulate the accelerator pedal.

When the auto cruise control system is operating, the processor 150 may be configured to design a virtual sound in consideration of a driving emotion (engine explosion sound emotion). The driving emotion may be classified into a sporty emotion, a powerful emotion, and a luxury emotion. In other words, the processor 150 may be configured to generate a virtual sound based on an order component based on the vehicle speed. In this connection, the vehicle speed may be classified into a low speed, a middle speed, and a high speed according to the RPM. The order may be defined as the number of events that cause vibration or noise per engine unit revolution.

In order to associate the order components at the low speed, the middle speed, and the high speed with the engine explosion sound emotions of the vehicle, the order components may be classified into order components of three levels and a driving emotion correlation with may be assigned thereto. A 1-level order component may be a fundamental (e.g., 1.5 order), a 2-level order component may be a double of the fundamental (e.g., 3 order), and a 3-level order component may be a triple of the fundamental (e.g., 4.5 order). The sporty emotion, the powerful emotion, and the luxury emotion may be allocated to the 1-level order component, the 2-level order component, and the 3-level order component, respectively.

In order to classify the order components of the three levels from the driving sound, the processor 150 may be configured to analyze a colormap of the driving sound using a deep learning-based colormap sound quality analysis algorithm (image pattern analysis). The processor 150 may be configured to classify order components according to the driving patterns into the three levels based on the colormap analysis. For example, the processor 150 may be configured to analyze the colormap of the driving sound shown in FIG. 2 and classify the order components based on the driving pattern into the order components of the three levels, that is, a 1-level order component 310, a 2-level order component 320, and a 3-level order component 330 as shown in FIG. 3.

The processor 150 may be configured to generate sound pressure change data based on an accelerator pedal open value using a big data-based driving emotion model. The processor 150 may be configured to synthesize the classified order component and the generated sound pressure change data with each other using a sound source synthesis program. The processor 150 may be configured to convert the synthesis result from a frequency domain to a time domain using the sound source synthesis program and via a multiple waveform audio format (WAV) configuration, and then may adjust a tone color and resistance based on a vehicle speed (driving speed) to reproduce a speed sensitive sound.

The processor 150 may be configured to match sounds before and after the operation of the auto cruise control system with each other and reproduce and output the matched sound. The processor 150 may be configured to mix a driving sound before the auto cruise control system operates and a virtual sound (emotion sound) after the auto cruise control system operates with each other using a sound mixing program such as AUDACITY. The processor 150 may be configured to repeatedly perform mixing (synthesizing) via automatic division and mixing automation to provide a sound change section. The processor may provide the mixture between the driving sound before the operation of the auto cruise control system and the virtual sound after the operation of the auto cruise control system. Thus, the processor 150 may be configured to provide the virtual sound without sense of difference even when the driver activates the auto cruise control system and removes his/her foot from the accelerator pedal.

Figure 4:
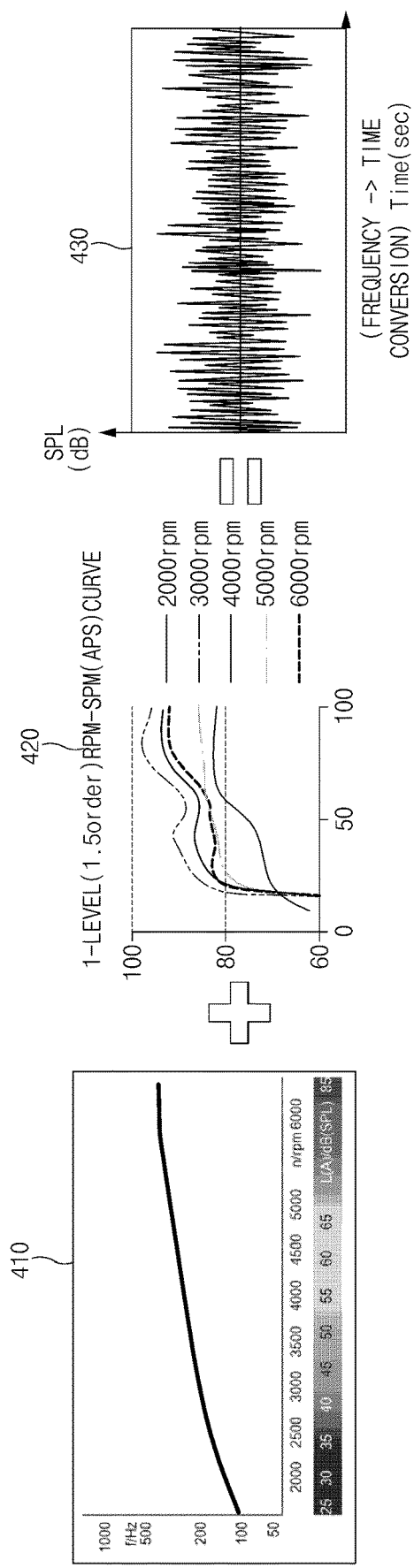
FIG. 4 and FIG. 5 are diagrams for illustrating speed sensitive virtual sound reproduction according to embodiments of the present disclosure.
Figure 5:
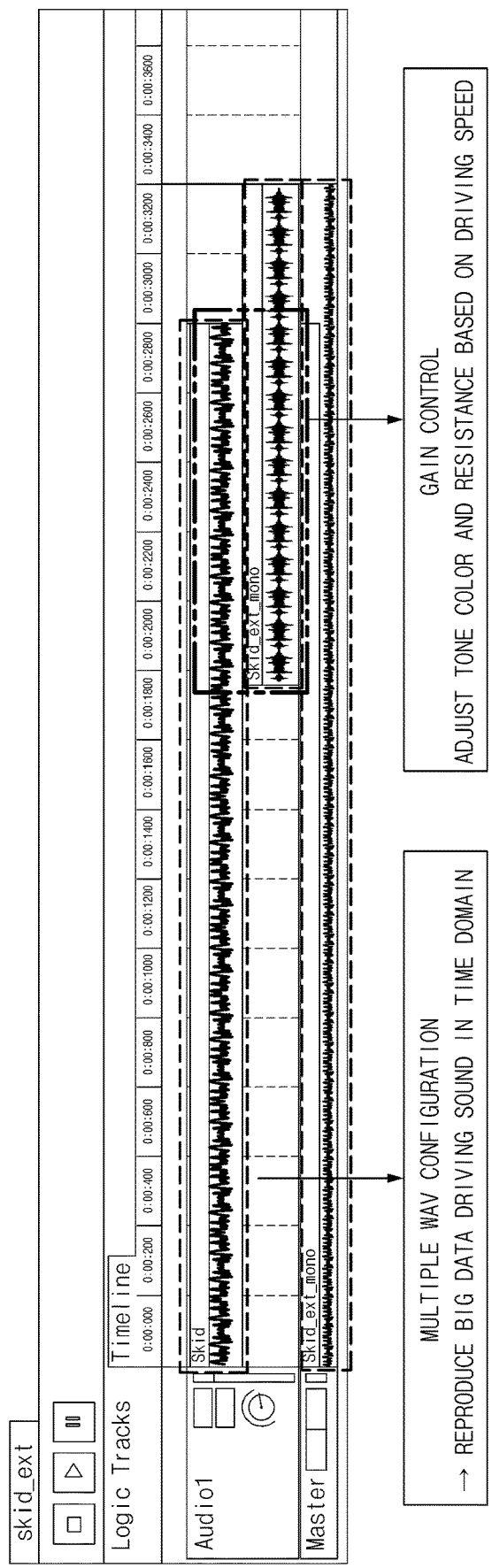

FIGS. 4 and 5 are diagrams for illustrating speed sensitive virtual sound reproduction according to embodiments of the present disclosure.

Referring to FIG. 4, the processor 150 may be configured to synthesize an order component 410 classified based on the driving pattern of the vehicle and sound pressure change data 420 based on the accelerator pedal open value with each other. The sound pressure change data 420 may be a big data-based driving emotion sound related to an indoor sound pressure level (SPL) based on the accelerator pedal open value (e.g., 0%, 50%, and 100%). The processor 150 may be configured to synthesize the classified order component 410 and the sound pressure change data 420 based on the accelerator pedal open value with each other using a sound source synthesis scheme such as granular synthesis to generate a speed sensitive virtual sound 430.

Referring to FIG. 5, the processor 150 may be configured to convert the big data-based driving emotion sound from the frequency domain to the time domain using the sound source synthesis program and via the multiple WAV configuration. The processor 150 may be configured to adjust a gain of the converted driving emotion sound to generate a speed sensitive virtual sound. When adjusting the gain, the processor 150 may be configured to change the tone color and adjust the resistance in relation to the vehicle speed.

Figure 6:
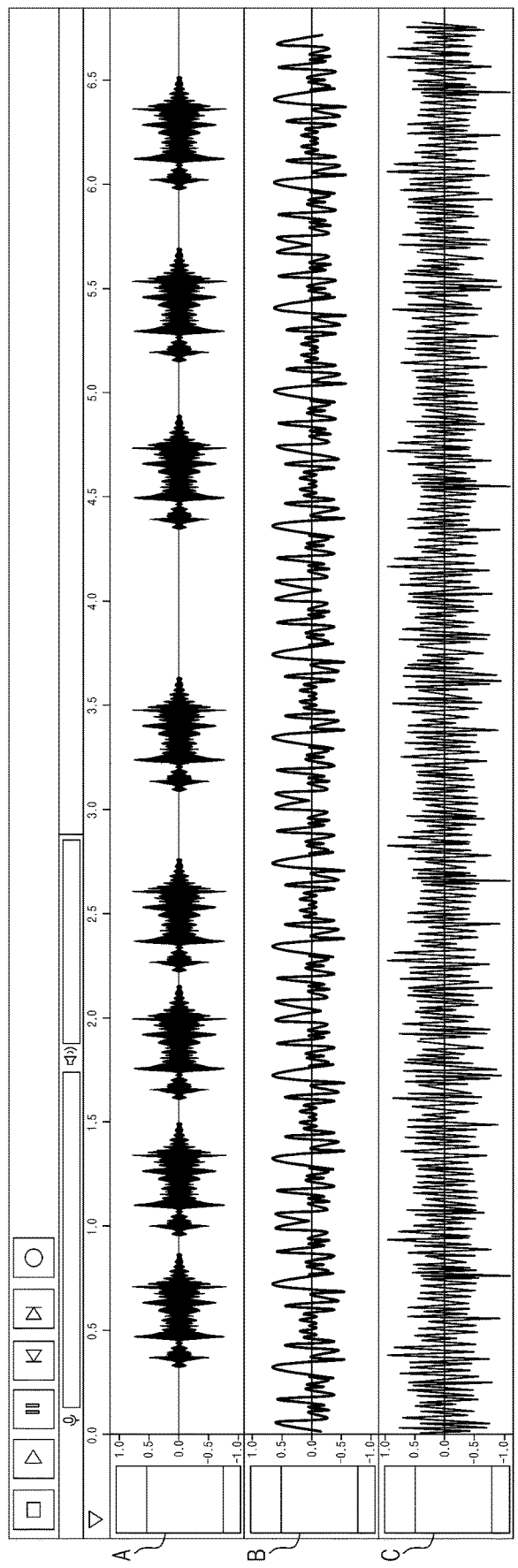
FIG. 6 is a diagram for illustrating a sound mixing according to embodiments of the present disclosure.

FIG. 6 is a diagram for illustrating a sound mixing according to embodiments of the present disclosure.

In a state in which the auto cruise control system is not operating, the processor 150 may be configured to reproduce a driving sound (i.e., a sound before the operation of the auto cruise control system) based on the accelerator pedal open value. When the driver operates the auto cruise control system and does not manipulate the accelerator pedal while reproducing the driving sound, the processor 150 may be configured to reproduce a virtual sound (big data-based emotion sound) based on the vehicle speed. In this connection, in order to prevent the sense of difference in a change section between a driving sound A and a virtual sound B, the processor 150 may be configured to synthesize the driving sound A with the virtual sound B to generate a first synthesized sound C as shown in FIG. 6.

The processor 150 may be configured to synthesize the driving sound A with the first synthesized sound C to generate a second synthesized sound D. The processor 150 may be configured to apply the second synthesized sound D to the driving sound A and the first synthesized sound C. Further, the processor 150 may be configured to mix the second synthesized sound C with the virtual sound B to generate a third synthesized sound E. When a sound change from the driving sound A to the virtual sound B occurs, the processor 150 may be configured to sequentially reproduce and output the second synthesized sound D, the first synthesized sound C, and the third synthesized sound E in the sound change section, thereby implement the sound change as natural as possible without any sense of the difference.

Figure 7:
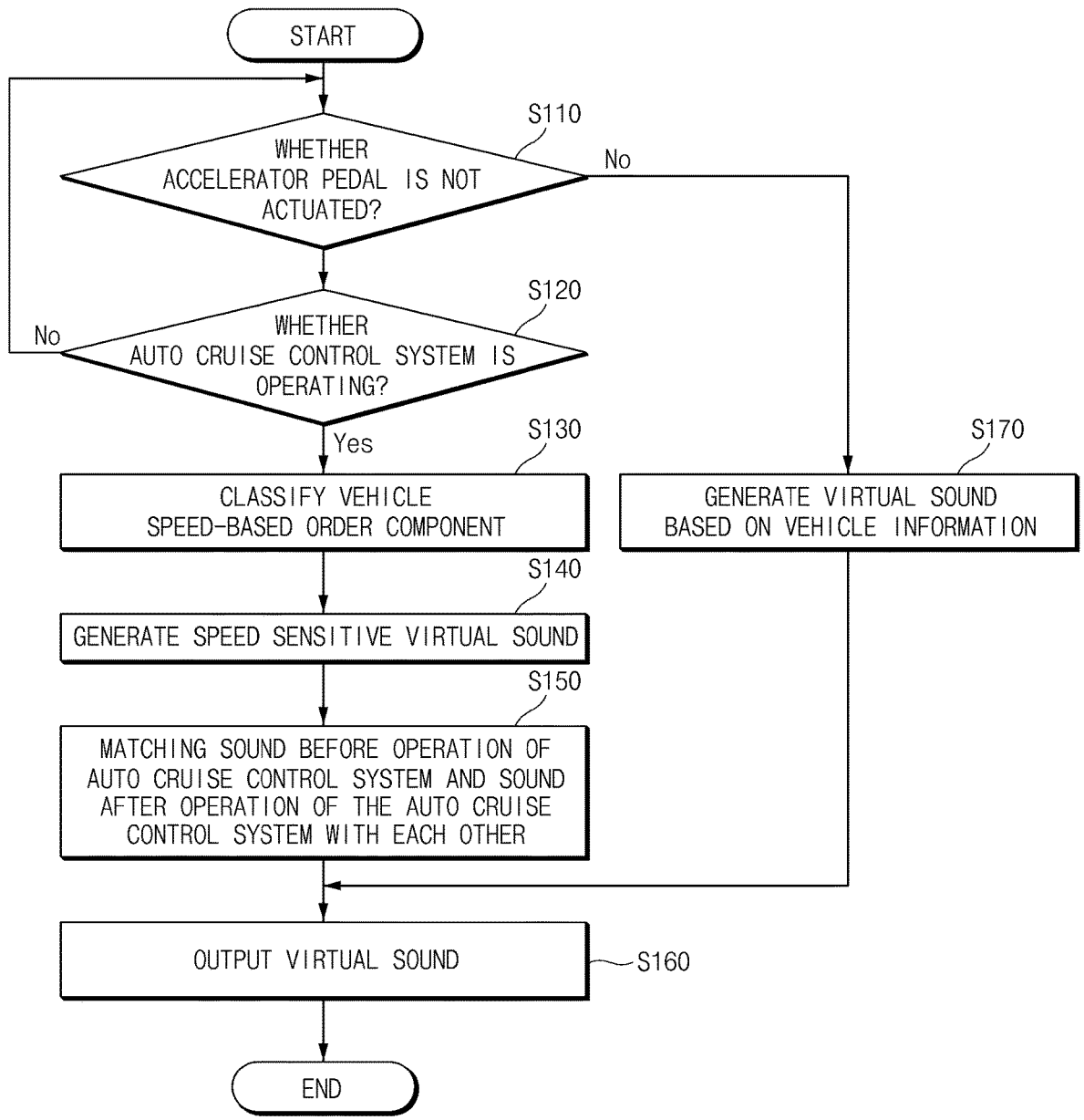
FIG. 7 is a flowchart illustrating a method for generating a sound for a vehicle according to embodiments of the present disclosure.

FIG. 7 is a flowchart illustrating a method for generating a sound for a vehicle according to embodiments of the present disclosure.

The processor 150 may be configured to determine whether the accelerator pedal is in a non-actuated state in S110. The processor 150 may be configured to determine whether the accelerator pedal is not actuated based on the accelerator pedal open value measured by the APS. When the accelerator pedal open value is 0%, the processor 150 may be configured to determine that the accelerator pedal is not actuated. The processor 150 may be configured to determine that the accelerator pedal is actuated when the accelerator pedal open value exceeds 0%.

When the accelerator pedal is not actuated, the processor 150 may be configured to determine whether the auto cruise control system is operating in S120. The processor 150 may be configured to determine whether the auto cruise control system operates based on a communication result with the auto cruise control system.

When the auto cruise control system is in operation, the processor 150 may be configured to classify vehicle speed-based order components from the driving sound source in S130. The processor 150 may be configured to classify the vehicle speed-based order components from the driving sound source (e.g., cruise control sound) into order components of the three levels.

The processor 150 may be configured to generate a speed sensitive virtual sound based on the classified order components in S140. The processor 150 may be configured to synthesize the driving emotion sound generated via the big data-based driving emotion model with the classified order component to generate the speed sensitive virtual sound.

The processor 150 may be configured to match the sounds before and after the operation of the auto cruise control system with each other in S150. The processor 150 may be configured to naturally implement a sound change between the driving sound before the operation of the auto cruise control system and the virtual sound (speed sensitive virtual sound) after the operation of the auto cruise control system using a sound source synthesis and automatic division mixing automation scheme.

The processor 150 may be configured to output the matched virtual sound in S160. The processor 150 may be configured to transmit the matched sound to the sound output device 140. The sound output device 140 may reproduce and output the matched sound.

When it is determined in S110 that the accelerator pedal is in the actuated state, the processor 150 may be configured to generate the virtual sound based on the vehicle information in S170. The processor 150 may be configured to generate the virtual sound based on the accelerator pedal open value. Thereafter, the processor 150 may be configured to reproduce and output the generated virtual sound through the sound output device 140 in S160.

Figure 8:
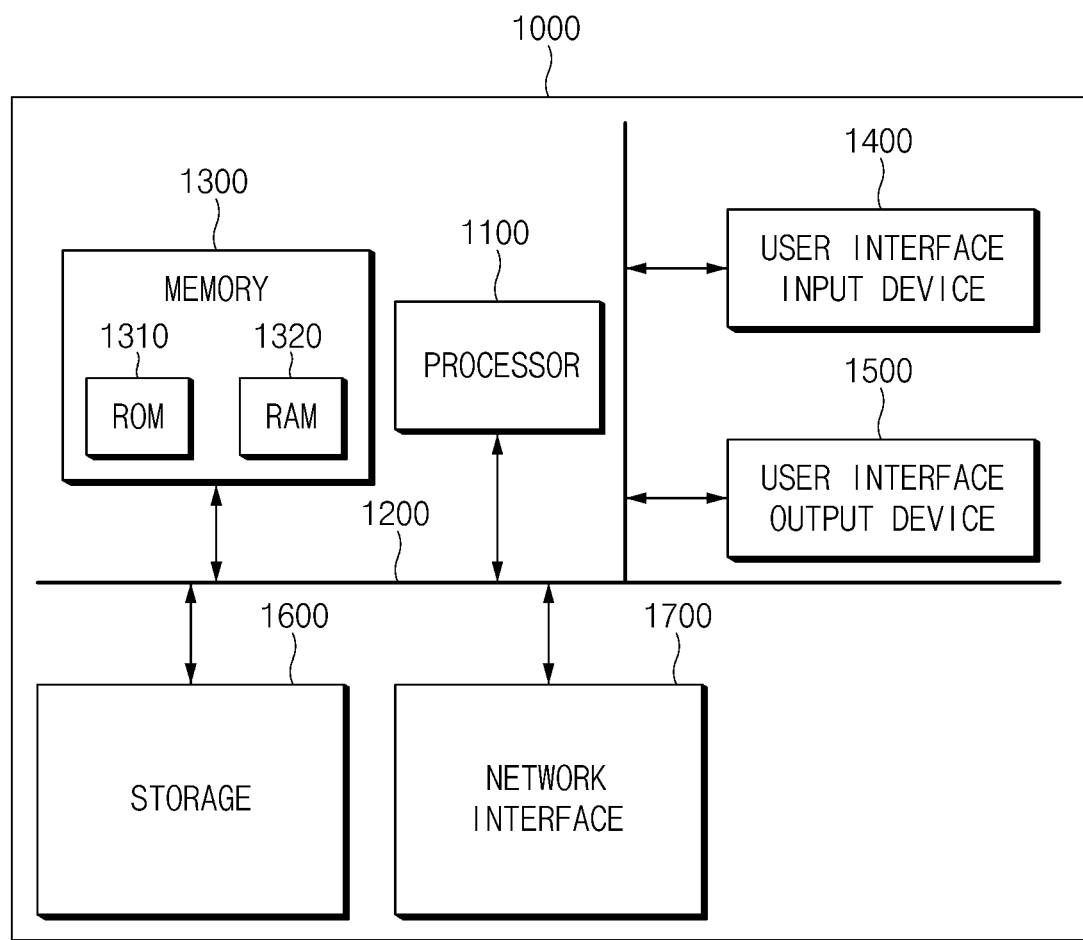
FIG. 8 is a block diagram showing a computing system executing a method for generating a sound for a vehicle according to embodiments of the present disclosure.

FIG. 8 is a block diagram showing a computing system executing a method for generating a sound for a vehicle according to embodiments of the present disclosure.

Referring to FIG. 8, a computing system 1000 may include at least one processor 1100, a memory 1300, a user interface input device 1400, a user interface output device 1500, storage 1600, and a network interface 1700 connected to each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include ROM 1310 and RAM 1320.

Thus, the operations of the method or the algorithm described in connection with the embodiments disclosed herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a removable disk, and a CD-ROM. The exemplary storage medium is coupled to the processor 1100, which may read information from, and write information to, the storage medium. In another method, the storage medium may be integral with the processor 1100. The processor 1100 and the storage medium may reside within an ASIC. The ASIC may reside within the user terminal. In another method, the processor 1100 and the storage medium may reside as individual components in the user terminal.

The description above is merely illustrative of the technical idea of embodiments of the present disclosure, and various modifications and changes may be made by those skilled in the art without departing from the essential characteristics of embodiments of the present disclosure. Therefore, the embodiments disclosed in embodiments of the present disclosure are not intended to limit the technical idea of embodiments of the present disclosure but to illustrate embodiments of the present disclosure, and the scope of the technical idea of embodiments of the present disclosure is not limited by the embodiments. The scope of embodiments of the present disclosure should be construed as being covered by the scope of the appended claims, and all technical ideas falling within the scope of the claims should be construed as being included in the scope of embodiments of the present disclosure.

According to embodiments of the present disclosure, the device generates the virtual sound based on the vehicle speed when the auto cruise control system operates, thereby preventing no sound while the auto cruise control system is operating.

Hereinabove, although embodiments of the present disclosure have been described with reference to exemplary embodiments and the accompanying drawings, embodiments of the present disclosure are not limited thereto, but may be variously modified and altered by those skilled in the art to which embodiments of the present disclosure pertain without departing from the spirit and scope of embodiments of the present disclosure claimed in the following claims.

What is claimed is:

1. A method for generating a sound for a vehicle, the method comprising:
    determining whether an accelerator pedal is actuated;
    upon determining that the accelerator pedal is not actuated, determining whether an auto cruise control system is operating;
    upon determining whether the auto cruise control system is operating, classifying a vehicle speed-based order component from a driving sound; and
    reproducing a speed sensitive virtual sound based on the classified vehicle speed-based order component,
    wherein the classifying of the vehicle speed-based order component comprises analyzing a colormap of the driving sound using a deep learning-based colormap sound quality analysis algorithm and classifying the analysis result into order components of three levels.

2. The method of claim 1, wherein the reproducing of the speed sensitive virtual sound comprises:
    synthesizing the classified vehicle speed-based order component with an emotion sound generated by the big data-based driving emotion model to generate a synthesized sound; and
    adjusting a tone color and a resistance of the synthesized sound based on the vehicle speed to generate the speed sensitive virtual sound.

3. The method of claim 2, wherein the reproducing of the speed sensitive virtual sound further comprises repeatedly performing mixing between a driving sound before the operation of the auto cruise control system and the speed sensitive virtual sound after the operation of the auto cruise control system.

4. The method of claim 1, wherein the determining of whether the accelerator pedal is actuated comprises determining whether the accelerator pedal is being actuated based on an accelerator pedal open value measured by an accelerator pedal position sensor.

5. The method of claim 4, wherein the reproducing of the speed sensitive virtual sound comprises:
    generating sound pressure change data based on the accelerator pedal open value; and
    synthesizing the classified vehicle speed-based order component with the generated sound pressure change data to generate the speed sensitive virtual sound.

6. A device for generating a sound for a vehicle, the device comprising:
    a detector for detecting whether an accelerator pedal is actuated and whether an auto cruise control system is operating; and
    a processor configured to:
        upon detection that the auto cruise control system is operating while the accelerator pedal is not actuated, classify a vehicle speed-based order component from a driving sound; and
        reproduce a speed sensitive virtual sound based on the classified vehicle speed-based order component;
        wherein classifying the vehicle speed-based order component comprises analyzing a colormap of the driving sound using a deep learning-based colormap sound quality analysis algorithm and classifying the analysis result into order components of three levels.

7. The device of claim 6, wherein the processor is further configured to:
    synthesize the classified vehicle speed-based order component with an emotion sound generated by a big data-based driving emotion model to generate a synthesized sound; and
    adjust a tone color and a resistance of the synthesized sound based on the vehicle speed to generate the speed sensitive virtual sound.

8. The device of claim 6, wherein the processor is further configured to repeatedly perform mixing between a driving sound before the operation of the auto cruise control system and the speed sensitive virtual sound after the operation of the auto cruise control system.

9. The device of claim 6, wherein the detector measures the accelerator pedal open value using an accelerator pedal position sensor, and wherein the processor is further configured to determine whether the accelerator pedal is being actuated based on the accelerator pedal open value.

10. The device of claim 9, wherein the processor is further configured to:
   generate sound pressure change data based on the accelerator pedal open value; and
   synthesize the classified vehicle speed-based order component with the generated sound pressure change data to generate the speed sensitive virtual sound.

11. A vehicle comprising the device of claim 6.

* * * * *